Patented Dec. 9, 1930

1,784,343

UNITED STATES PATENT OFFICE

ERNST FELLMER, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW AZO DYESTUFFS

No Drawing. Application filed February 25, 1928, Serial No. 257,098, and in Germany August 17, 1922.

This application is a continuation-in-part application of my application Ser. No. 647,-180, filed June 22, 1923, and relates to the preparation of new and valuable para-diamine azodyestuffs suitable for dyeing silk. These dyes can be obtained by combining the diazo compounds of paradiamines, e. g. paraphenylene diamines, which are substituted in one of the two amino groups by an acidyl radicle, e. g. formyl, acetyl, oxalyl etc. and in the benzene or naphthalene nucleus, by e. g. halogen, alkyl and alkoxygroups with azodyestuff components, splitting off the acidyl radicle by saponification, diazotizing the resulting compound and combining it with a hydroxy naphthalene sulfonic acid.

The new dyestuffs have most probably the general formula:

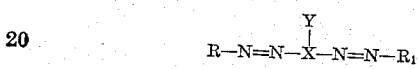

wherein X represents the residue of a p-diamine of the benzene or naphthalene series having not more than ten carbon atoms in nuclear linkage, Y represents a halogen, alkyl or alkoxy substituent, and R and $R_1$ represent hydroxy-naphthalene sulfonic acid azo dyestuff coupling components the hydroxy groups of which stand in o-position to the azo groups. The new azodyestuffs are, after being dried and pulverized, in the shape of their alkali metal salts generally dark powders, soluble in concentrated sulfuric acid generally with a blue to bluish-green coloration, dyeing silk reddish-blue to black shades of excellent fastness to water which can be discharged to a pure white with hydrosulfite, which dyestuffs upon reduction with stannous chloride and hydrochloric acid are split up into a substituted para diamine and two molecules of amino-naphthol-sulfonic acids.

In order to illustrate my new process more fully the following example is given, the parts being by weight:

*Example.*—24,4 parts of 5-amino-4-chloro-2-oxalylamino-1-anisol are dissolved in water together with sodium carbonate to a neutral solution which is acidulated at 5° C. and diazotized with 6.9 parts of sodium nitrite. The diazo-compound is then combined with 22,4 parts of 2-napthol-6-sulfonic acid. By boiling with 140 parts of a 30 per cent caustic soda lye, the oxalyl group is split off and the aminoazocompound is isolated by acidulation. It is stirred up with water, dissolved in caustic soda lye, acidulated, diazotized at 0° with 6, 9 parts of sodium nitrite and combined in a soda alkaline solution with 22,4 parts of 1-hydroxynaphthalene-5-sulfonic acid. The dye is isolated as usual.

It is after being dried and pulverized in the shape of its sodium salt a dark powder, soluble in cold water with a violet coloration, in hot water with a blue one and in concentrated sulfuric acid with a greenish blue coloration, yielding upon treatment with stannous chloride and hydrochloric acid 2.5-diamino-4-chloro-1-anisol, 1-amino-2-hydroxynaphthalene-6-sulfonic acid and 1-hydroxy-2-aminonaphthalene-5-sulfonic acid and dyeing silk pure blue shades fast to water which can be discharged to a pure white with hydrosulfite. The dye has in the free state most probably the formula:

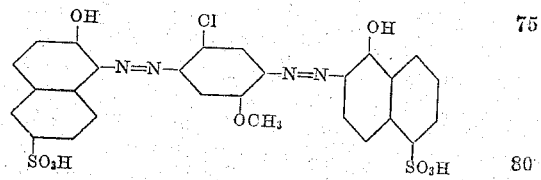

Other diamines can be used e. g. 1-acetyl-amino-4-aminonaphthalene-6-sulfonic acid, 5-amino-4-chloro-2-oxylylaminoanisol, 5-amino-4-methyl-2-acetylamino-1-methoxy-benzene, 5-amino-4-alkoxy-2-acetyl-amino-1-alkoxy-benzene, 2.5-dichloro-4-amino-1-acetylaminobenzene, 4-amino-1-acetylamino-benzene-3-sulfonic acid etc. or other coupling components e. g. 1-naphthol-4-sulfonic acid, 2-naphthol-3.6-disulfonic acid, 2-naphthol-7-sulfonic acid, 2-amino-8-naphthol-6-sulfonic acid, 2-amino-8-naphthol-3.6-disulfonic acid.

I claim:

1. As new products the azodyestuffs having the general formula:

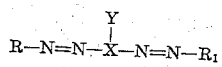

wherein X represents the residue of a p-diamine of the benzene or naphthalene series having not more than ten carbon atoms in nuclear linkage, Y represents a substituent of the group consisting of halogen, alkyl, alkoxy and R and R₁ represent a hydroxynaphthalene sulfonic acid azodyestuff coupling component, the hydroxy groups of which stand in o-position to the azo groups, which azodyestuffs are, after being dried and pulverized, in the shape of their alkali metal salts dark powders soluble in concentrated sulfuric acid generally with a blue to bluish green coloration, dyeing silk reddish-blue to black shades of excellent fastness to water which can be discharged to a pure white with hydrosulfite, which dyestuffs upon reduction with stannous chloride and hydrochloric acid, are split up into a substituted para diamino-compound and two molecules of amino-naphthol-sulfonic acid.

2. As new products the azodystuffs having the general formula:

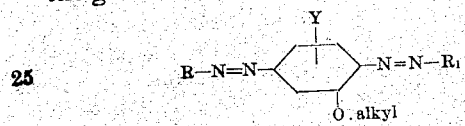

wherein Y represents a substituent of the group comprising hydrogen, halogen, alkyl and alkoxy, and R and R₁ represent hydroxynaphthalene sulfonic acid azodyestuff coupling components, the hydroxy groups of which stand in ortho-position to the azo groups which azodyestuffs are, after being dried and pulverized in the shape of their alkali metal salts dark powders soluble in concentrated sulfuric acid generally with a blue to bluish-green coloration, dyeing silk reddish-blue to black shades of excellent fastness to water which can be discharged to a pure white with hydrosulfite, which dyestuffs upon reduction with stannous chloride and hydrochloric acid, split up into a substituted para diamino-compound and two molecules of amino-naphthol-sulfonic acid.

3. As new products the azodyestuffs having the general formula:

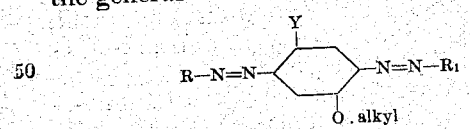

wherein Y represents a substituent of the group comprising hydrogen, halogen, alkyl and alkoxy, and R and R₁ represent a hydroxy-naphthalene sulfonic acid azodyestuff coupling component, the hydroxy groups of which stand in ortho-position to the azo groups, which azodyestuffs are, after being dried and pulverized, in the shape of their alkali metal salts, dark powders soluble in concentrated sulfuric acid generally with a blue to bluish green coloration, dyeing silk reddish-blue to black shades of excellent fastness to water which can be discharged to a pure white with hydrosulfite, which dyestuffs upon reduction with stannous chloride and hydrochloric acid, are split up into a substituted para-diamino compound and two molecules of amino-naphthol-sulfonic acid.

4. As a new product the azodyestuff having in the free state most probably the formula:

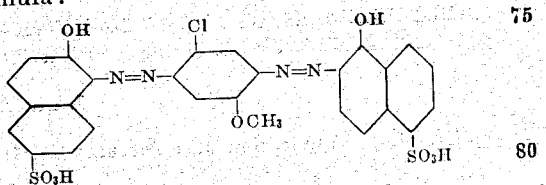

which is after being dried and pulverized in the shape of its sodium salt a dark powder soluble in cold water with a violet coloration, in hot water with a blue one and in concentrated sulfuric acid with a greenish-blue coloration, yielding upon treatment with stannous chloride and hydrochloric acid 2.5-diamino-4-chloro-1-anisol, 1-amino-2-hydroxynaphthalene-6-sulfonic acid and 1-hydroxy-2-aminonaphthalene-5-sulfonic acid; and dyeing silk pure blue shades fast to water which can be discharged to a pure white with hydrosulfite.

5. As a new product, silk dyed with the dyestuffs claimed in claim 1.

6. As a new product, silk dyed with the dyestuffs claimed in claim 2.

7. As a new product, silk dyed with the dyestuffs claimed in claim 3.

8. As a new product, silk dyed with the dyestuff claimed in claim 4.

In testimony whereof I have hereunto set my hand.

ERNST FELLMER.